(12) United States Patent
Simeon et al.

(10) Patent No.: US 7,726,993 B2
(45) Date of Patent: Jun. 1, 2010

(54) ELECTRICAL AND PNEUMATIC CONNECTION DEVICE

(75) Inventors: Marc Simeon, Moree (FR);
Jean-Philippe Pineau, Landes le Gaulois (FR); Jean-Claude Brizion, Vendome (FR)

(73) Assignee: Thales (FR)

( * ) Notice: Subject to any disclaimer, the term of this patent is extended or adjusted under 35 U.S.C. 154(b) by 0 days.

(21) Appl. No.: 11/721,119

(22) PCT Filed: Nov. 30, 2005

(86) PCT No.: PCT/EP2005/056340

§ 371 (c)(1),
(2), (4) Date: Sep. 29, 2009

(87) PCT Pub. No.: WO2006/061344

PCT Pub. Date: Jun. 15, 2006

(65) Prior Publication Data

US 2010/0015830 A1    Jan. 21, 2010

(30) Foreign Application Priority Data

Dec. 7, 2004    (FR) .................................. 04 13021

(51) Int. Cl.
*H01R 13/642* (2006.01)
(52) U.S. Cl. ........................ 439/195; 439/191; 213/1.3; 213/76

(58) Field of Classification Search ................. 439/195, 439/191, 192, 190; 213/1.3, 76; 285/68, 285/69, 87; 303/15
See application file for complete search history.

(56) References Cited

U.S. PATENT DOCUMENTS

| | | | |
|---|---|---|---|
| 5,480,042 A * | 1/1996 | Engle | 213/1.3 |
| 5,658,159 A | 8/1997 | Gardner et al. | |
| 5,865,329 A | 2/1999 | Gay et al. | |
| 6,102,443 A * | 8/2000 | Lang, Jr. | 285/65 |
| 6,705,478 B1 | 3/2004 | Engle | |
| 2002/0058436 A1 | 5/2002 | Saba | |

FOREIGN PATENT DOCUMENTS

DE    28 43 247    4/1980

\* cited by examiner

*Primary Examiner*—Gary F. Paumen
(74) *Attorney, Agent, or Firm*—Lowe Hauptman Ham & Berner, LLP

(57) ABSTRACT

The invention relates to a device for connecting an item of equipment and two cables, one of which carries electrical data and the other of which carries pneumatic data. The device comprises an electrical socket and a pneumatic socket, both mounted on an item of equipment, an electrical plug secured to a cable, the electrical plug being intended to be connected to the electrical socket, and a pneumatic plug secured to a cable, the pneumatic plug being intended to be connected to the pneumatic socket. According to the invention, when the pneumatic plug is in a connected but unlocked position, the electrical plug cannot be plugged in.

6 Claims, 1 Drawing Sheet

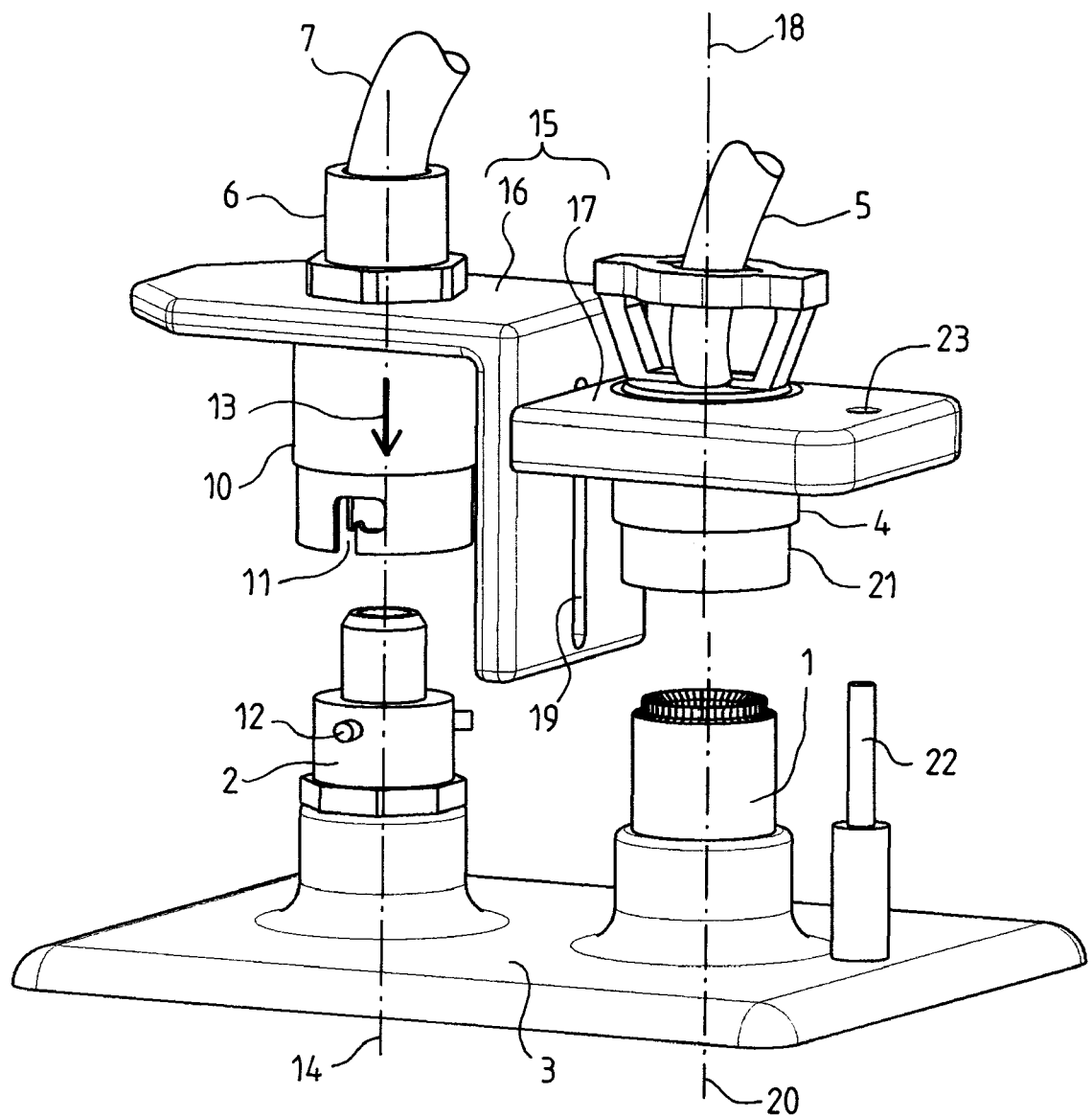

ELECTRICAL AND PNEUMATIC CONNECTION DEVICE

RELATED APPLICATIONS

The present application is based on International Application No. PCT/EP2005/056340 filed Nov. 30, 2005 and claims priority from French Application Number 04 13021, filed Dec. 7, 2004, the disclosures of which are hereby incorporated by reference herein in their entirety.

BACKGROUND OF THE INVENTION

The invention relates to a device for connecting an item of equipment and two cables one of which carries electrical data and the other of which carries pneumatic data. The invention finds a particular use in connecting an anemometric/barometric probe mounted on the skin of an aircraft. This type of probe takes pressure measurements from the air surrounding the aircraft using pressure tappings situated on the probe and sensors situated inside the aircraft. In order to connect the pressure tappings to the sensors, the probe has a pneumatic socket into which is plugged a pneumatic plug connected to the sensors via a lead. Furthermore, high-altitude aircraft flight entails the need to heat the probe, for example, by means of a resistive heating element embedded in the probe. The supply of electricity to the resistive element is provided, at the probe end, by an electrical socket and, at the aircraft end, by a lead ending in an electrical plug connected to the electrical socket.

Hitherto, the two plugs, the electrical plug and the pneumatic plug, have been connected independently. It is a relatively simple matter to detect a poor electrical connection. It is, for example, possible to measure the resistance of an electrical component, in this instance the resistive heating element, situated in the probe, via the electric lead.

Checking that the pneumatic plug has been correctly connected to its socket is far more difficult to do. A pneumatic measurement will not provide assurance that the pneumatic plug is correctly connected. Another option is to check the electrical continuity of the body of the pneumatic plug with respect to the body of its socket. This option is generally incompatible with aeronautical standards which dictate that pneumatic connectors must be electrically insulated.

SUMMARY OF THE INVENTION

It is an object of the invention to alleviate this problem by proposing a way of indicating the status of a pneumatic connection which does not involve checking the electrical continuity of the pneumatic connection.

To this end, one subject of the invention is a connection device comprising an electrical socket and a pneumatic socket, both mounted on an item of equipment, an electrical plug secured to a cable, the electrical plug being intended to be connected to the electrical socket, and a pneumatic plug secured to a cable, the pneumatic plug being intended to be connected to the pneumatic socket, characterized in that when the pneumatic plug is in a connected but unlocked position, the electrical plug cannot be plugged in.

BRIEF DESCRIPTION OF THE DRAWING

The invention will be better understood and other advantages will become apparent from reading the detailed description of one embodiment given by way of example, the description being illustrated by the attached drawing in which:

the single FIGURE depicts a connection device according to the invention.

DETAILED DESCRIPTION OF THE PREFERRED EMBODIMENT

The device depicted in FIG. 1 comprises an electrical socket 1 and a pneumatic socket 2, both mounted on an item of equipment 3 of which only the part near the sockets 1 and 2 has been depicted. The device also comprises an electrical plug 4 secured to a cable 5. The plug 4 is intended to be connected to the electrical socket 1. The device also comprises a pneumatic plug 6 secured to a cable 7. The plug 6 is intended to be connected to the pneumatic socket 2. The socket 1 and the plug 4 form an electrical connection. The socket 2 and the plug 6 form a pneumatic connection.

The ends of the cables 5 and 7 which are not connected to the plugs 4 and 6 are connected to an item of equipment, not depicted in the FIGURE, the equipment comprising at least one pressure sensor processing pneumatic data passing through the pneumatic connection and a device processing electrical data passing through the electrical connection. This device for example powers a resistive heating element positioned inside the equipment item 3.

The device further comprises means for preventing the plug 4 from being connected to the electrical socket 1 as long as the pneumatic plug 6 is not locked onto its socket 2. The mere fact that the pneumatic plug 6 is connected to its socket 2 is not enough to allow the electrical plug 4 to be connected to its socket 1. In order to allow the electrical connection to be made it is necessary for the pneumatic plug 6 to be both connected and locked. Thus, the making of the electrical connection provides the assurance that the pneumatic connection has been made. The device is, for example, used on board an aircraft to connect an anemometric/barometric probe that forms the item of equipment 3 and allows flight parameters, such as the speed or the angle of incidence of the air with respect to the aircraft, for example to be determined, it is easy to generate data regarding the correct making of the electrical connection, for example, by measuring the electrical continuity between the electrical socket 1 and the body of the electrical plug 4. It is also possible to measure the resistance of an electrical component belonging to the probe, this component being connected via the electrical connection. This data is representative of the status of the electrical connection and therefore of the status of the pneumatic connection. The data is then sent to the aircraft pilot or to the maintenance services, for example in the form of an illuminated indicator or of an alarm, letting them know whether the two connections of the probe, the pneumatic one and the electrical one, have been made correctly.

Advantageously, the pneumatic plug 6 comprises a locking ring 10 for locking it to the socket 2. The locking ring is advantageously of the quick lock type. The ring 10 comprises, for example, slots 11 engaging with pins 12 belonging to the socket 2 to lock in the manner of a bayonet fastening. The pneumatic plug 6 plugs into the pneumatic socket 2 in a direction 13 of an axis 14. The locking ring 10 can rotate about the axis 14 between an unlocked position and a locked position. To lock the plug 6 on the socket 2 the pins 12 are pushed into the slots 11 in the direction 13, then the ring 10 is rotated about the axis 14. Advantageously, the electrical plug 4 is secured to the locking ring 10 via a support 15. The support 15 turns with the ring 10 as the pneumatic plug 6 is locked. The support 15 comprises two parts 16 and 17. The part 16 is fixed to the ring 10. The part 17 has freedom of translational movement with respect to the part 16 along an axis 18 parallel to the axis 14. The electrical plug 4 is fixed to the part 17. The axis 18 is the plugging-in axis of the electrical plug 4. The part 16, for example, comprises a slideway 19 directed along the axis 18 which accepts the part 17. The slideway 19 allows translational movement of the part 17 with respect to the part 16. The electrical socket 1 has a plugging-in axis 20. In order to plug the plug 4 into the socket 1 it is necessary for the axes 18 and 20 to be concurrent. This can be achieved only when the ring 10 is in the position in which it is locked to the pneumatic socket 2. When the axes 18 and 20 are concurrent, the electrical plug 4 and the part 17 can be slid in the slideway along the axes 18 and 20 to make the electrical connection. It is possible to lock the electrical connection using a locking ring 21 which is free to rotate with respect to the plug 4 about the axis 18. The ring 21 may provide a bayonet fastening or a screw-fastening of the plug 4 to the socket 1.

The amplitude of the translational movement of the electrical plug 4 with respect to the locking ring 10 is limited in such a way that it is impossible for the electrical plug 4 to be connected to its socket 1 as long as the pneumatic connection has not been locked.

The method of establishing the two connections follows the following sequence:

connecting the pneumatic plug 6 to the pneumatic socket 2, then locking the pneumatic plug 6 to the pneumatic socket 2, then connecting the electrical plug 4 to the electrical socket 1.

When the two connections are to be unplugged, it is necessary to unplug the electrical plug 4 in order to be able to unlock the pneumatic plug 6.

The disconnection method follows the following sequence:

disconnecting the electrical plug 4 from the electrical socket 1, then unlocking the pneumatic plug 6 from the pneumatic socket 2, then disconnecting the pneumatic plug 6 from the pneumatic socket 2.

Advantageously, the device comprises means for preventing the electrical plug 4 from being plugged in if the angular orientation of the electrical plug 4 with respect to the socket 1 about the axis 18 is incorrect, that is to say is not an orientation that allows the electrical plug 4 to be connected electrically to its socket 1. These means, for example, comprise a pin 22 fixed to the item of equipment 3 and running parallel to the axis 20. When the pneumatic connection is locked and the axes 18 and 20 are therefore concurrent, the pin 22 can enter a hole 23 formed in the part 17. This makes it possible to prevent the electrical connection from being made before the pneumatic connection has been made. Certain electrical connectors are already provided with angular polarizing devices and there is then no need to provide the pin 22 and the corresponding hole 23.

It will be readily seen by one of ordinary skill in the art that embodiments according to the present invention fulfill many of the advantages set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

The invention claimed is:

1. A connection device for connection to a piece of equipment and to a cable comprising:

an electrical socket and a pneumatic socket, both mounted on the piece of equipment, an electrical plug secured to the cable, the electrical plug being intended to be connected to the electrical socket, and a pneumatic plug secured to a cable, the pneumatic plug being intended to be connected to the pneumatic socket, wherein when the pneumatic plug is in a connected but unlocked position, the electrical plug cannot be plugged in.

2. The device as claimed in claim 1, wherein the pneumatic plug comprises a locking ring for locking it to the pneumatic socket, and wherein the electrical plug is secured to the locking ring.

3. The device as claimed in claim 2, wherein the pneumatic plug plugs into the pneumatic socket in a direction of an axis, the locking ring is of the quick lock type, the locking ring can rotate about the axis between an unlocked position and a locked position, and when the locking ring is in the locked position, a plugging-in axis of the electrical plug coincides with a plugging-in axis of the electrical socket.

4. The device as claimed in claim 3, wherein it comprises means for preventing the electrical plug from being plugged in if the angular orientation of the electrical plug with respect to the socket about the axis is incorrect.

5. A method for connecting a device as claimed in claim 1, comprising the steps of:

connecting the pneumatic plug to the pneumatic socket, then locking the pneumatic plug to the pneumatic socket, then connecting the electrical plug to the electrical socket.

6. A method for disconnecting a device as claimed in claim 1, comprising the steps of:

disconnecting the electrical plug from the electrical socket, then unlocking the pneumatic plug from the pneumatic socket, then disconnecting the pneumatic plug from the pneumatic socket.

* * * * *